(12) United States Patent
MacLaughlan (10) Patent No.: US 10,940,963 B2
(45) Date of Patent: Mar. 9, 2021

(54) TIP FILLING METHOD AND IMPROVEMENTS

(71) Applicant: Todd Ewen MacLaughlan, Orlando, FL (US)

(72) Inventor: Todd Ewen MacLaughlan, Orlando, FL (US)

(73) Assignee: Profounda Health and Beauty Inc., Orlando, FL (US)

( * ) Notice: Subject to any disclaimer, the term of this patent is extended or adjusted under 35 U.S.C. 154(b) by 371 days.

(21) Appl. No.: 16/020,020

(22) Filed: Jun. 27, 2018

(65) Prior Publication Data

US 2018/0370663 A1     Dec. 27, 2018

Related U.S. Application Data (60) Provisional application No. 62/525,324, filed on Jun. 27, 2017.

(51) Int. Cl.
| | | |
|---|---|---|
| *B65B 1/16* | (2006.01) | |
| *A61C 1/08* | (2006.01) | |
| *A61C 19/06* | (2006.01) | |
| *B65B 3/00* | (2006.01) | |
| *A61C 1/00* | (2006.01) | |

(52) U.S. Cl.
CPC ............. *B65B 1/16* (2013.01); *A61C 1/0061* (2013.01); *A61C 1/087* (2013.01); *A61C 19/063* (2013.01); *B65B 3/003* (2013.01)

(58) Field of Classification Search
CPC ........... B65B 1/16; B65B 3/3003; B65B 3/00; B65B 31/02; B65B 31/042; A61C 19/063; A61C 1/087; A61C 19/06; B65D 81/2038; B65D 81/203; B65D 81/2015; B65D 81/2007; B65D 81/20

USPC ......................................................... 141/65

See application file for complete search history.

(56) References Cited

U.S. PATENT DOCUMENTS

| | | | | |
|---|---|---|---|---|
| 3,656,517 A | * | 4/1972 | Taylor ..................... | B65B 1/363 141/1 |
| 4,373,535 A | * | 2/1983 | Martell .............. | A61B 5/15003 600/578 |
| 4,774,963 A | * | 10/1988 | Ichikawa ........... | A61B 5/15003 600/576 |
| 5,222,529 A | | 6/1993 | Zoltan et al. | |
| 5,236,355 A | | 8/1993 | Brizzolara et al. | |
| 6,065,270 A | | 5/2000 | Reinhard et al. | |

(Continued)

*Primary Examiner* — Timothy P. Kelly
*Assistant Examiner* — Stephanie A Shrieves
(74) *Attorney, Agent, or Firm* — Dentons Cohen & Grigsby P.C.

(57) ABSTRACT

A device for filling a container, such as a dispensing tip, with a powdered or liquid material, and methods of use of the device are disclosed. The device generally includes a vacuum manifold having at least one port, and a vacuum source for creating a negative pressure in the vacuum manifold. The device may further include at least one container having an axial bore therethrough, a proximal end, and a distal end which includes a stop positioned therein. The negative pressure created in the vacuum manifold by the vacuum pump is sufficient to pull the powdered or liquid material through the distal end into the axial bore of the at least one container. A clearance between an outer surface of the stop and an inner wall of the container is configured to prevent passage of the powdered or liquid material.

14 Claims, 6 Drawing Sheets

(56) References Cited

U.S. PATENT DOCUMENTS

| | | | |
|---|---|---|---|
| 6,674,022 B2 * | 1/2004 | Fermier | G01G 19/384 |
| | | | 141/83 |
| 6,682,348 B2 | 1/2004 | Lawter et al. | |
| 7,134,459 B2 * | 11/2006 | Carlson | B01F 3/188 |
| | | | 141/130 |
| 8,887,770 B1 * | 11/2014 | Shippert | A61M 1/0058 |
| | | | 141/65 |
| 9,402,701 B2 | 8/2016 | MacLaughlin et al. | |
| 9,566,141 B2 | 2/2017 | Wu et al. | |
| 2003/0186191 A1 * | 10/2003 | Lawter | B05C 17/00593 |
| | | | 433/90 |
| 2007/0186992 A1 * | 8/2007 | Bullen | B65B 3/003 |
| | | | 141/65 |
| 2014/0318875 A1 * | 10/2014 | Poole | G01G 13/24 |
| | | | 177/1 |
| 2015/0112251 A1 * | 4/2015 | MacLaughlan | A61M 13/00 |
| | | | 604/58 |

\* cited by examiner

TIP FILLING METHOD AND IMPROVEMENTS

RELATED APPLICATIONS

This application claims the benefit under 35 U.S.C. § 119(e) of prior U.S. Provisional Patent Application Ser. No. 62/525,324, filed on Jun. 27, 2017, the entire content of which is hereby incorporated by reference.

TECHNICAL FIELD

This invention pertains generally to a filling apparatus for powdered or liquid materials, and more specifically, to methods and devices for filling a dispensing tip (cartridge) with a powdered or liquid material.

BACKGROUND

Syringes used to deliver powdered agents, such as pharmacologically active agents, are known. For example, finely powdered solid antibiotic agents may be administered into the periodontal pocket of a patient suffering from periodontal disease using a cartridge such as disclosed in U.S. Pat. Nos. 5,236,355, 6,682,348, or U.S. Pat. No. 9,402,701. These cartridges generally have long, narrow tips filled with the powdered agent, and small openings for dispensing the agent into the periodontal pocket.

The current method for filling this type of cartridge with a powdered material involves blowing the powder into the dispensing end or tip of the cartridge. As detailed in U.S. Pat. No. 5,222,529, powder is placed into a funnel positioned a specific distance from the tip, and the powder is carried across this gap by a stream of gas that blows the powder into the open dispensing end of the tip. This method is not reliable and often requires multiple attempts to fill the tip, resulting in loss of the powder and/or 'compacted' powder within the tip. As such, the reproducibility of the fill for multiple cartridge tips may vary. Additionally, this method generally requires a plunger in the tip to be 'set' from the dispensing end of the tip prior to filling, which is a manual process accomplished by inserting a rod through the dispensing end and pushing the plunger in the tip further away from the dispensing end.

Other methods known in the art include filing the cartridge during manufacture thereof. For example, U.S. Pat. No. 6,065,270 discloses methods of manufacturing a syringe which include forming the syringe body, siliconizing an inside surface of the syringe body, sealing a first end of the syringe body, filing the syringe body with the powdered material through a second open end, and sealing the second open end. Since one seal includes a cap on the tip of the syringe and the other seal includes a plunger, such a method may require large volumes of powdered material (e.g., enough to fill the syringe) as insertion of the plunger will likely displace air from the syringe body and disrupt the powdered material. Moreover, addition of the powdered material through the tip end may be time consuming, and/or less accurate for smaller volumes of the powder.

Accordingly, there exists a need for improved methods and devices for filing a container such as a cartridge with a powdered material, especially small volumes of material such as milligram or microliter amounts.

SUMMARY

The presently disclosed invention overcomes many of the shortcomings of the prior art by providing a device for filling a container, such as a dispensing tip or cartridge, with a material. The device generally comprises a vacuum manifold having at least one port configured for airtight attachment of a container, and a vacuum source for creating a negative pressure in the vacuum manifold.

According to certain aspects of the present invention, the at least one port may include a set screw configured to contact a proximal end of a stop of the container, and to position the stop axially within the container.

According to certain aspects of the present invention, the at least one port may include a limit element configured to limit an axial position of the container within the port.

According to certain aspects of the present invention, the device may further include at least one container having an axial bore therethrough, such as a dispensing tip. The container generally includes a proximal end, and a distal end which includes a stop positioned therein and an exit opening. The container is configured for air-tight attachment to the at least one port via the proximal end, so that the negative pressure created in the vacuum manifold by the vacuum pump is sufficient to pull the material through the exit opening and into the axial bore of the at least one container. For powdered materials, a clearance between an outer surface of the stop and an inner wall of the distal end of the at least one container may be less than a diameter of individual grains of the powdered material. For liquid materials, a viscosity of the liquid may prevent passage of the liquid past the stop, i.e., through the clearance. As such, the material may be pulled into the distal or dispensing end of the container to a point in the container defined by the stop.

According to certain aspects of the present invention, the device may further include a reservoir configured to contain the powdered or liquid material and sized to accept the vacuum manifold and to position the exit opening of at least one container attached to the vacuum manifold within the powdered or liquid material.

The presently disclosed invention further provides a method of filling at least one container with a powdered or liquid material. The method generally comprises attaching a proximal end of the at least one container to at least one port on a vacuum manifold; positioning the vacuum manifold with the at least one container attached thereon within a reservoir comprising the powdered or liquid material, wherein an exit opening at a distal end of the at least one container is positioned in contact with the powdered or liquid material; and activating a vacuum source to provide a negative pressure within the vacuum manifold, wherein the negative pressure is sufficient to pull the powdered or liquid material through the exit opening and into the distal end of the at least one container.

According to certain aspects of the present invention, the method may further include inserting a plunger or stop into an inner axial bore of the at least one container before the container is attached to the at least one port of the vacuum manifold. Further, according to certain aspects of the present invention, a position of a set screw of the at least one port may be adjusted, wherein the position of the set screw varies a position of the plunger or stop within the at least one container and an amount of the powdered or liquid material which may be pulled into the distal end of the at least one container.

The presently disclosed invention further provides a dispensing tip for delivering a powdered or liquid material. The dispensing tip generally comprises a barrel having a proximal end and a distal end, and an exit opening at the distal end thereof, wherein the distal end of the barrel has a smaller diameter than the proximal end; and a plunger at least partially disposed within the barrel and configured for slideable movement therein, the plunger comprising a tip at a distal end. The plunger may be configured to contact and expel the powdered or liquid material from the exit opening. A clearance between an outer surface of the tip of the plunger and an inner wall of the distal end of the barrel may be less than a diameter of individual grains of the powdered material, or the viscosity of the liquid may prevent passage thereof past the plunger.

According to certain aspects of the present invention, the clearance between an outer surface of the stop or the tip of the plunger and an inner wall of the container or the distal end of the dispensing tip barrel may be about 100 microns or less, such as 50 microns or less, or even 10 microns or less. According to certain aspects of the present invention, the clearance between an outer surface of the stop or the tip of the plunger and an inner wall of the container or the distal end of the dispensing tip barrel may be about less than 100 microns, less than 50 microns, or even less than 10 microns, but not less than 1 micron. Furthermore, the diameter of the individual grains of the powdered material may be 10 microns or greater, such as 50 microns or greater, or even 100 microns or greater.

BRIEF DESCRIPTION OF THE DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the presently disclosed invention, unless stated to be otherwise, are not necessarily drawn to scale.

DETAILED DESCRIPTION

In the following description, the present invention is set forth in the context of various alternative embodiments and implementations involving methods and devices for filing a container, such as a dispensing tip, with a powdered or liquid material. While the following description discloses numerous exemplary embodiments, the scope of the present patent application is not limited to the disclosed embodiments, but also encompasses combinations of the disclosed embodiments, as well as modifications to the disclosed embodiments.

Various aspects of the device and dispensing tip may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Various aspects of the devices and methods disclosed herein may be described and illustrated with reference to one or more exemplary implementations. As used herein, the term "exemplary" means "serving as an example, instance, or illustration," and should not necessarily be construed as preferred or advantageous over other variations of the devices, systems, or methods disclosed herein. "Optional" or "optionally" means that the subsequently described event or circumstance may or may not occur, and that the description includes instances where the event occurs and instances where it does not. In addition, the word "comprising" as used herein means "including, but not limited to".

Relative terms such as "lower" or "bottom" and "upper" or "top" may be used herein to describe one element's relationship to another element illustrated in the drawings. It will be understood that relative terms are intended to encompass different orientations of aspects of the device in addition to the orientation depicted in the drawings. By way of example, if aspects of the device or dispensing tip in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

It must also be noted that as used herein and in the appended claims, the singular forms "a", "an", and "the" include the plural reference unless the context clearly dictates otherwise. For example, although reference is made herein to "a" tip, "an" inlet aperture, or "the" set screw, one or more of any of these components and/or any other components described herein can be used. Unless defined otherwise, all technical and scientific terms used herein have the same meanings as commonly understood by one of ordinary skill in the art.

The present invention uses a novel approach to fill a container, such as a dispensing tip, with a powdered or liquid material. The devices and methods disclosed herein use suction to pull air or a gas around a stop, such as a distal end of a plunger positioned within the dispensing tip, and thus pull a powdered or liquid material into an open dispensing end of the dispensing tip. The unique design of the stop does not, however, allow the powdered or liquid material to pass around the stop. This is contrary to the design of a standard syringe or dispensing tip, where a stop or plunger is designed to create an airtight seal with an internal wall of the syringe or dispensing tip, thus isolating and sealing the tip region filled with the powdered or liquid material.

Following is a description of the basic principles and functions of the present invention, with certain details illustrated in the exemplary embodiments shown in FIGS. 1-7. As shown in the figures, the container 22 may comprise a dispensing tip. Throughout the remainder of this description, reference may be made to the container as a dispensing tip. However, such reference should not be understood to limit the embodiments of the devices or methods disclosed herein as enabled only for a dispensing tip. Other forms of a container are within the scope of the presently disclosed invention.

Figure 1:
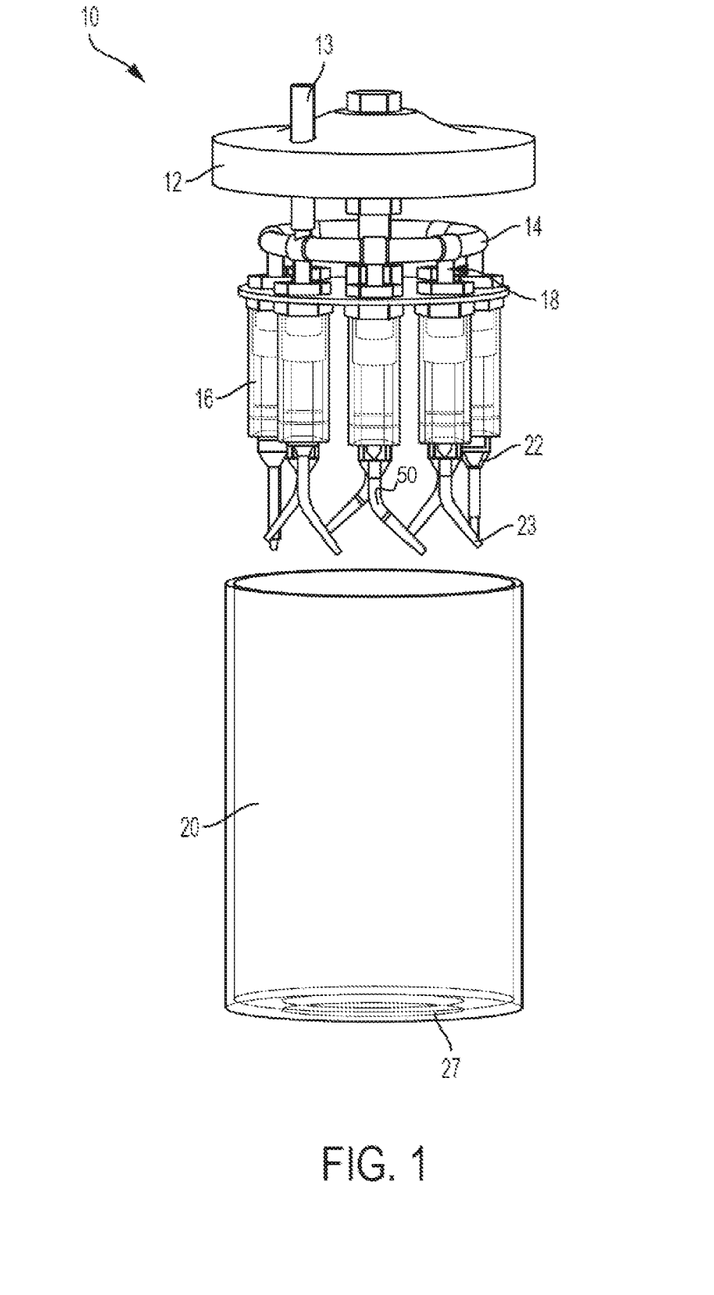
FIG. 1 illustrates a schematic diagram of a device for filling a container with a powdered or liquid material in accordance with certain aspects of the presently disclosed invention.

With specific reference to FIG. 1, a device 10 according to the present invention may comprise a vacuum manifold 14 configured for attachment of at least one dispensing tip 22 having an axial bore therethrough. The dispensing tip 22 may have a distal end 23, and a proximal end which may be attachable to a port 18 of the vacuum manifold 14.

Figure 2:
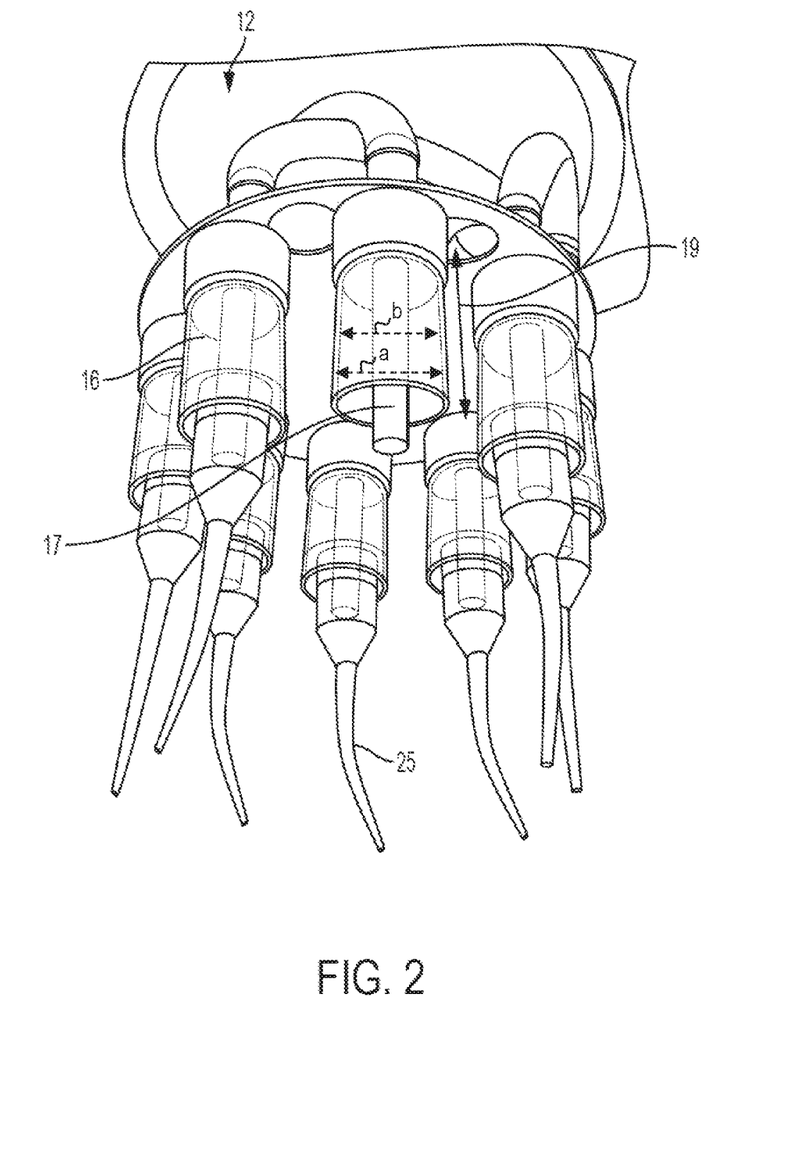
FIG. 2 illustrates a bottom perspective view of the device shown in shown in FIG. 1 pointing out a set screw in a port of the vacuum manifold.

The vacuum manifold 14 may include more than one port, with each port providing attachment of a dispensing tip 22. As shown in FIGS. 1 and 2, the vacuum manifold 14 may include eight ports 18, wherein each is configured for air-tight attachment of a proximal end of a dispensing tip 22, and thus provides fluid communication between the vacuum manifold 14 and the internal axial bore of each dispensing tip 22. While eight ports 18 are shown in the FIGS. 1 and 2, a device comprising more ports or fewer ports is within the scope of the present invention. For example, the device 10 may include 1 port 18, or 2, 3, 4, 5, 6, 7, 8, 9, 10, or even more ports 18 which provide attachment of the dispensing tip(s) 22 to the vacuum manifold 14.

A gasket 16 may be included to provide the air-tight attachment of the proximal end of the dispensing tip 22 to the port 18. As shown in FIGS. 1 and 2, the gasket 16 may be a flexible or elastomeric tubing into which the proximal end of the dispensing tip 22 may fit or be attachable thereto. Alternatively, the gasket may be configured to fit or attach within the internal bore of the dispensing tip 22 to provide the air-tight connection. While a specific embodiment is shown, any means known in the art that may provide an air-tight, releasable attachment between an open end of a dispensing tip and a port of a vacuum manifold 14 is envisioned and within the scope of the present invention. For example, connection between the dispensing tip 22 and the port 18 may be via threaded counterparts, such as an internally threaded port and an externally threaded dispensing tip, or vice versa. As a further example, the connection between the dispensing tip 22 and the port 18 may be via a snap fit connection utilizing flanges and the like.

According to certain aspects of the presently disclosed invention, the port(s) 18 may include a limit element configured to limit an axial position of the dispensing tip 22 when attached to the port 18. For example, when the port 18 includes a gasket 16, the limit element may be a decreased inner diameter (a>b) of the gasket 16, i.e., when the dispensing tip 22 is attached to an inner bore of the gasket 16 (see FIG. 2). Alternatively, the limit element may be an increased inner diameter of the gasket 16, i.e., when the dispensing tip 22 is attached about an outer surface of the gasket 16.

Furthermore, the dispensing tip 22 may include attachment or connection means at the proximal end that may be utilized by an actuator, syringe, or other dispensing or pressure applying means, and which also provide connection to the port 18 via the gasket 16. In such a case, the dispensing tip 22 may be attachable to the port 18 in any of the means indicated above, such as by pushing a gasket 16 inside of the dispensing tip 22, or pushing the dispensing tip 22 inside of the gasket 16, etc. Alternatively, the dispensing tip 22 may include attachment or connection means at the proximal end that may not be a part of the connection to the port 18 via the gasket 16.

Attachment or connection of the dispensing tip 22 onto the port(s) 18 of the vacuum manifold 14 may be manual, or may be automated. Moreover, attachment of the dispensing tip 22 onto the port(s) 18 of the vacuum manifold 14 may be sequential or simultaneous.

As shown in FIG. 2, the port 18 may further include a set screw 17. The set screw 17 is generally configured to contact a proximal end of a stop positioned within the dispensing tip 22. A distance between a distal end of the stop and the distal end 23 of the dispensing tip, which comprises the exit opening, may determine an amount of the powdered or liquid material that may be pulled into the internal axial bore of the dispensing tip 22. Thus, the set screw provides a convenient means to set the loading amount for the dispensing tip 22.

The set screw 17 may be adjustable so that the loading amount may be varied. That is, a longitudinal position of the set screw 17, along arrow 19 of FIG. 2, may be changed so that the position of the stop within the internal bore of the dispensing tip 22 may be changed. Moreover, the positions of individual set screws 17 on the vacuum manifold 14 may be adjusted, or all of the set screws on the vacuum manifold may be adjusted simultaneously.

The vacuum provided through the vacuum manifold 14 and ports 18 may include a path through and/or around the set screws 17. As shown in FIGS. 1 and 2, according to certain aspects, the set screw 17 may be hollow and may thus provide a more direct path for the vacuum within the dispensing tips 22.

The vacuum manifold 14 may be included on a support structure 12, such as at least a lid and/or other framework, which may position the vacuum manifold 14 on and/or within a reservoir 20 above a bottom surface 27 thereof. The reservoir 20 may include an enclosed container configured to hold the powdered or liquid material (60 of FIG. 3). The support structure 12 may position the vacuum manifold 14 above the reservoir 20 so that a distal end 23 of an attached dispensing tip 22 (i.e., dispensing tip 22 attached to a port 18 of the vacuum manifold 14) may be positioned within, or make contact with, a powdered or liquid material.

Figure 3:
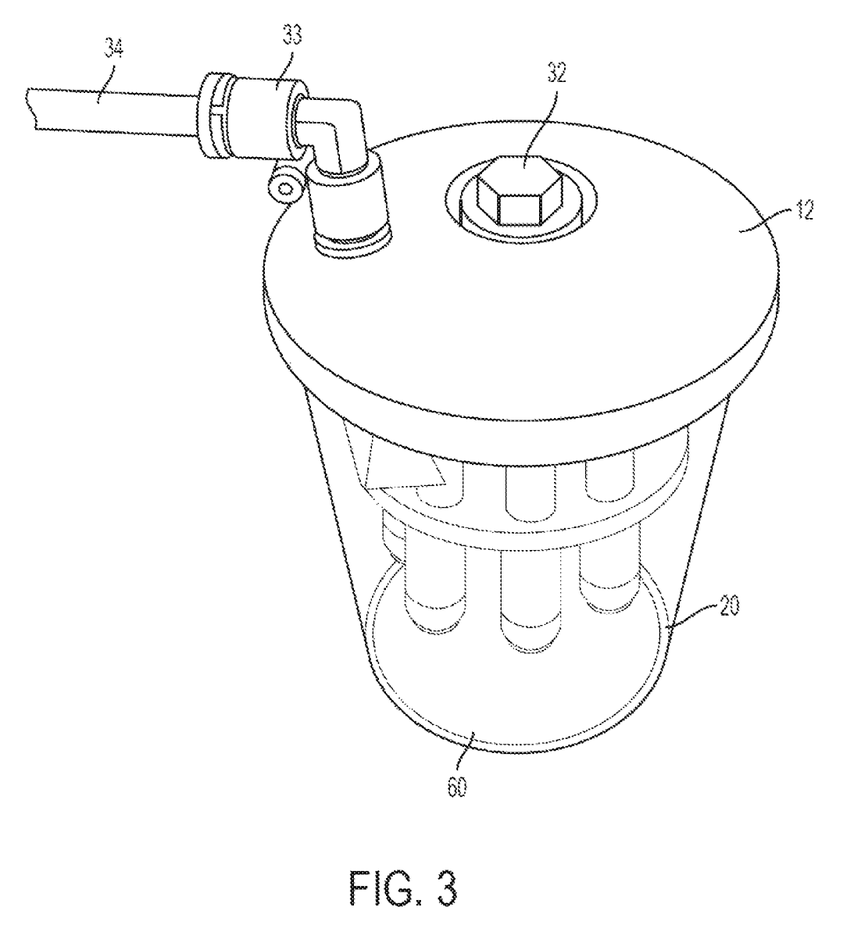
FIG. 3 illustrates a top perspective view of the device shown in FIG. 1 attached to a reservoir filled with a powdered material.

Furthermore, the vacuum manifold 14 may include a vacuum inlet port 13 configured for attachment to a fluid path. As shown in FIG. 3, the fluid path may include connection means 33 and additional distal fluid paths 34. Also shown in FIG. 3 is the reservoir 20, support structure 12, a connection means 32 for the vacuum manifold 14 to the support structure 12, and the powdered or liquid material 60 contained within the reservoir 20.

Figure 4:
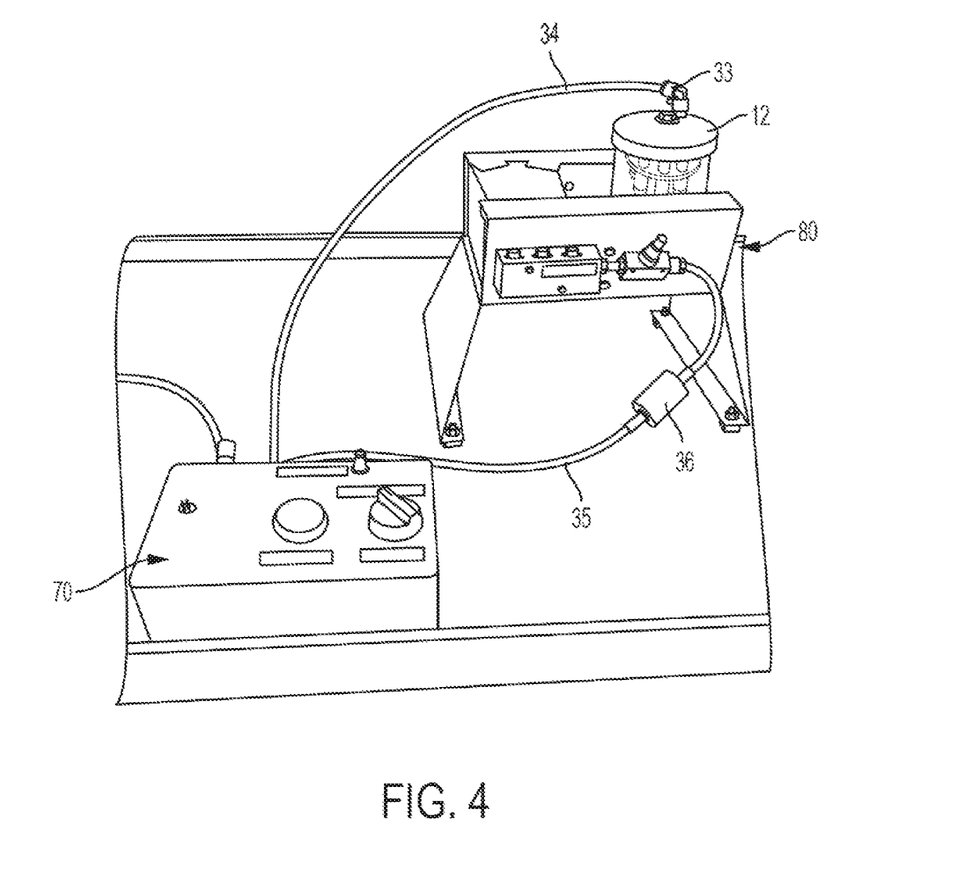
FIG. 4 illustrates a system including a vacuum source and support for multiple devices for filling a container with a powdered or liquid material in accordance with certain aspects of the presently disclosed invention.

The distal fluid path 34 may provide connection to a vacuum source, such as a vacuum pump and optionally a controller 70 (FIG. 4). The controller 70 may be used to start/stop the vacuum source, open/close one or more portions of the fluid path, control the amount of the vacuum (i.e., negative pressure) generated by the vacuum source, or any combination thereof. For example, the controller may be used to control flow to individual devices 10 (i.e., vacuum manifolds 14) when multiple devices are in use, such as in the system shown in FIG. 4, or may be used to control flow to individual ports 18 of a vacuum manifold 14, or any combination thereof.

Additional components may be included, such as a stand or support 80 which may be used to position or hold more than one reservoir 20 and vacuum manifold 14. Thus, systems of the present invention may comprise one or more reservoir 20 and vacuum manifold 14, each connectible to the vacuum source and/or controller. As shown in FIG. 4, a stand 80 configured to hold one or more reservoirs 20 and vacuum manifolds 14 may include additional fluid path lines 35 and components, such as filters 36 which may filter the air pulled through the distal ends 23 of the dispensing tips 22. Such filtering may protect the vacuum source from contamination by the powdered or liquid material 60 being filled into the dispensing tips 22 in the case of a leak, such as a poor connection between a dispensing tip 22 and a port 18.

The vacuum or negative pressure generated by the vacuum source is sufficient to pull the powdered or liquid material in through the distal end 23 (i.e., through the exit opening) of the dispensing tip 22. The powdered or liquid material will enter the axial bore of the dispensing tip 22 up to a distal end of the stop. The clearance between an outer surface of the stop and an inner wall of the distal end of the dispensing tip (inner wall of the axial bore of the dispensing tip) is large enough to allow a flow of air or gas to pass, such as the flow of air or gas generated by the negative pressure created by the vacuum source. The clearance, however, is not large enough to allow the powdered material to pass. That is, the clearance is less than a diameter of individual grains of the powdered material. As such, very little if any powder will pass the distal end of the stop toward a proximal end of the dispensing tip 22.

The clearance between the outer surface of the stop and the inner surface of the dispensing tip may be 50 microns or less, 40 microns or less, 30 microns or less, 20 microns or less, or 10 microns or less. The clearance between the outer surface of the stop and the inner surface of the dispensing tip may be less than 50 microns, less than 40 microns, less than 30 microns, less than 20 microns, or less than 10 microns.

In general, the device of the present invention may be used to hold powdered or particulate materials, such as a dry microparticle composition. For example, dry microparticle compositions may include therapeutic agents, such as antibacterials, antibiotics, antifungal agents, anti-inflammatory agents, immunosuppressive agents, immunostimulatory agents, dentinal desensitizers, odor masking agents, immune reagents, anesthetics, antiseptics, nutritional agents, antioxidants, lipopolysaccharide complexing agents, peroxides, tissue growth factors, or mixtures thereof.

Exemplary therapeutic agents may be antibiotics such as tetracycline, a pharmaceutically acceptable salt of a tetracycline, hydrates of a tetracycline and hydrates of a pharmaceutically acceptable salt of a tetracycline. The tetracyclines may be doxycycline, a pharmaceutically acceptable salt of doxycycline, hydrates of doxycycline and hydrates of a pharmaceutically acceptable salt of doxycycline. Also, the tetracycline may be minocycline, a pharmaceutically acceptable salt of minocycline, hydrates of minocycline and hydrates of a pharmaceutically acceptable salt of minocycline.

As one specific example, the dry microparticle composition can be minocycline Hydrochloride (HCl) microspheres, wherein the composition may be loaded into the dispensing tip at, for example, a 0.1 to 10 mg dosage, such as a 1 mg dosage. The minocycline Hydrochloride (HCl) microspheres may be loaded into the dispensing tip at, for example, a 0.1 to 10 mg dosage, or a 0.1 to 5 mg dosage, or a 0.1 to 2 mg dosage, or a 0.1 to 1 mg dosage, or a 0.5 to 10 mg dosage, or a 1 to 10 mg dosage, or a 2 to 10 mg dosage, or a 5 to 10 mg dosage. The minocycline Hydrochloride (HC) microspheres may be loaded into the dispensing tip at, for example, a 0.5 mg dosage, or a 1.0 mg dosage, or a 1.5 mg dosage, or a 2.0 mg dosage, or a 3.0 mg dosage, or a 5.0 mg dosage.

These compositions can be dispersed in matrices of biocompatible and biodegradable polymers such as, for example, polyglycolide, poly(I-lactide), poly(dl) lactide, poly (glycolide-co-lactide), poly (glycolide-co-dl lactide), poly (alpha hydroxybutyric acid, poly(orthoesters), poly (p-dioxanone) and mixtures thereof. The polymers can also be block copolymers of polyglycolide, trimethylene carbonate and polyethylene oxide.

Individual grains or particles of the particulate compositions, i.e., powders, may have diameters ranging from about 0.1 to about 1000 microns, and specifically, from about 10 to about 200 microns, such as about 10 to about 90 microns. As such, the clearance between the outer surface of the stop and the inner surface of the dispensing tip (surface of the inner axial bore) may be less than the diameter of the individual grams of the powdered or particulate material, wherein the diameter of the individual grains of the powdered material is 50 microns or greater, or 40 microns or greater, 30 microns or greater, 20 microns or greater, or 10 microns or greater.

When the material loaded into the dispensing tip 22 is a liquid material, such as a viscous liquid material, the negative pressure generated by the vacuum source may be insufficient to pull the liquid past the stop. Alternatively, when the liquid is not a viscous liquid, or when the viscosity is not sufficient to keep the liquid from passing the stop when under a negative pressure, the stop may include a liquid sensitive material that may swell on contact with the liquid. Such a liquid sensitive material may reduce or eliminate the clearance between the outer surface of the stop and the inner surface of the dispensing tip when hydrated, thus stopping passage of the liquid past the stop of the dispensing tip. Accordingly, a liquid sensitive material (57) may be included on an outer circumference of the stop (56), such as the surface that contacts or is proximal to the inner surface of the inner bore of the dispensing tip (see FIG. 6A). Moreover, the liquid sensitive material may be non-reactive with the liquid compositions to be loaded into the dispensing tip.

As indicated above, the amount of powdered or liquid material loaded into the dispensing tip generally depends on the position of the stop within the internal axial bore of the dispensing tip 22. As shown in the figures, the stop may be configured as a plunger. A depth of the plunger within the internal axial bore of the dispensing tip 22 may be set, as detailed above, from the back (proximal side of the plunger) using the set screw 17, and occurs automatically when the dispensing tip 22 is releasably attached to the port 18 on the vacuum manifold 14. A height of the set screw 17 determines how far the plunger will be pushed into the dispensing tip 22, and thus provides a method for a precise fill. Suction is then applied to the proximal end of the dispensing tip 22 which pulls the powder into the dispensing tip 22 from the distal end 23 to the preset level of the plunger, i.e., the distal tip of the plunger being the "stop".

The present invention further provides methods for filling at least one dispensing tip 22 with a powdered or liquid material. One method according to certain aspects of the present invention generally comprises attaching a proximal end of the at least one dispensing tip 22 to at least one port 18 on a vacuum manifold 14. The vacuum manifold 14 may then be positioned with the at least one dispensing tip 22 attached thereon within a reservoir 20 containing the powdered or liquid material 60, wherein an exit opening at a distal end 23 of the at least one dispensing tip 22 is positioned in contact with the powdered or liquid material. A vacuum source may then be activated to provide a negative pressure within the vacuum manifold 14, which may pull the powdered or liquid material in through the exit opening at the distal end 23 of the at least one dispensing tip 22.

If fewer dispensing tips 22 than the total number of ports 18 are attached to the vacuum manifold 14, the vacuum to the unused ports may be stopped. For example, caps or other closures may be attached to the unused port(s) 18 or gasket 16 of a port 18, or valves for each unused port 18 may be closed.

The method may further include adjusting a position of the set screw 17 for each port 18 individually, or all at once, before the dispensing tip(s) 22 are attached to the gasket 16 of each port 18 of the vacuum manifold 14. The position of the set screw 17 determines a position of the stop, and thus an amount of the powdered or liquid material that may be pulled into the distal end 23 of the dispensing tip 22.

The method may further comprise inserting a stop, such as a plunger, into the barrel or internal axial bore of the at least one dispensing tip 22, before the dispensing tip(s) 22 are attached to the gasket 16 of each port 18 of the vacuum manifold 14. A clearance between an outer surface of a distal end of the stop, e.g., tip 56 of the plunger 50 (FIGS. 5-7), and an inner wall of the distal end 23 of the at least one dispensing tip 22 is less than a diameter of individual grains of the powdered material. In the case of a viscous liquid, the viscosity of the liquid may prevent passage of the liquid past the stop, i.e., through the clearance. Moreover, the amount of material pulled into the tip of the dispenser may be varied by adjusting a position of a set screw of the at least one port.

The present invention also provides novel containers, such as a dispensing tip, useful with the devices and methods described herein. For example, as indicated above, the dispensing tip 22 may be useful for delivering a granular, powdered or viscous liquid material, such as for delivery of a powdered or liquid material to a patient. The dispensing tip may generally include a barrel having a proximal end and a distal end, and an exit opening at the distal end thereof.

The dispensing tip 22 may include a plunger at least partially disposed within the dispensing tip barrel and configured for slideable movement therein. The plunger may comprise a tip 56 (see FIGS. 5 and 6) at a distal end 54, wherein the plunger tip 56 is configured to contact and expel the powdered or viscous liquid material from the exit opening. A clearance (59) between an outer surface of the tip (56) of the plunger and an inner wall of the distal end of the inner axial bore of the barrel (22) may be less than a diameter of individual grains of the powdered material (see FIG. 6A). For example, the clearance may be about 50 microns or less, such as 40 microns or less, or 30 microns or less, or 20 microns or less, or 10 microns or less. Moreover, a clearance between an outer surface of the tip of the plunger and an inner wall of the distal end of the inner axial bore of the barrel may be small enough that in combination with a specific applied vacuum pressure, a viscous liquid may not pass therethrough.

Figure 5:
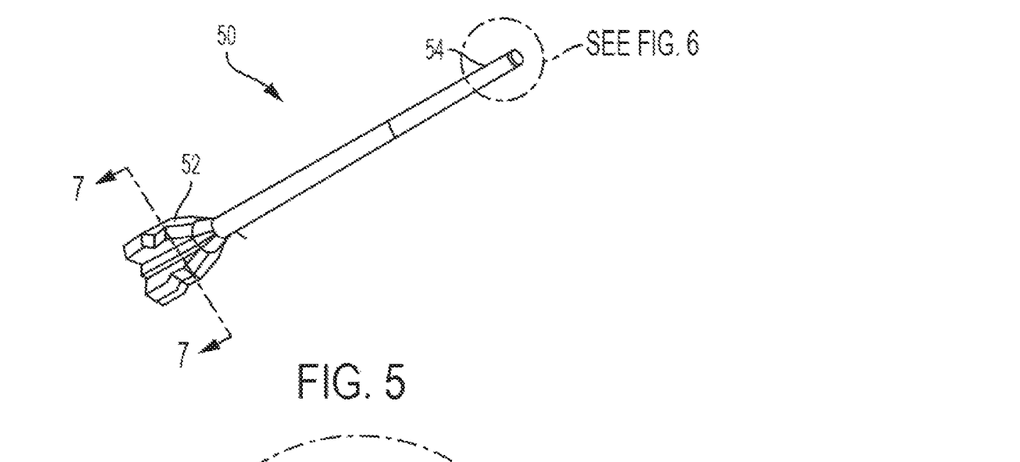
FIG. 5 illustrates a plunger in accordance with certain aspects of the presently disclosed invention.

As shown in FIGS. 1, 2, and 5, the distal end 23 of the dispensing tip 22 may have a smaller diameter than the proximal end thereof. Moreover, the distal end may include a bend 25 at a point along the narrower distal portion. The stop or plunger may be flexible to accommodate the bend or curve, or may also be curved.

The distal end 23 or tip of the dispensing tip 22 may terminate in an exit opening. The dispensing tip 22 and/or the distal end 23 thereof may be non-flexible, or may be formed of a material or thickness that provides flexibility. For example, distal end 23 or tip of the dispensing tip 22 may comprise a malleable material, thereby making the tip portion deformable. Thus for example, the tip portion can be capable of changes in its geometry especially when placed in contact with a surface, such as a surface of the cavity being treated or a surface which leads to the opening of the cavity being treated. In the context of a periodontal pocket, that surface is either a wall of the periodontal pocket or a portion of the tooth or gum outside of the pocket against which the tip portion is pressed allowing for deformation of the opening at the end of the tip portion for potentially better insertion of the tip portion into the cavity being treated. It should be noted that the general tip portion and the opening of the tip portion do not need to be the same type or degree of deformation, and the present invention includes embodiments in which only the tip opening is deformed without deformation of the general tip portion, only the general tip portion is deformed without deforming the tip opening, and deformations of both the tip opening and deformation of the general tip portion.

The dispensing tip 22 may be formed of any material known in the art. The body or barrel of the dispensing tip 22 may be formed of a polymeric material such as, for example, olefin homopolymers or copolymers or mixtures thereof, such as polypropylene (e.g., MONTELL PD-626 Polypropylene), or polyethylene.

A cap may be included to close or secure the exit opening of the distal end 23 of the dispensing tip 22. The cap may be formed of a polymeric material such as, for example, a polypropylene.

While specific polymeric materials have been disclosed and further discussed herein, the presently disclosed invention is not limited to these materials as other materials may provide the essential features and advantages of the disclosed invention.

The plunger may be enclosed within the dispensing tip 22 in a frictionally tight but slideable engagement. An inwardly tapered portion of the distal end of the dispensing tip 22 may serve as a travel limit for the plunger so that it may not exit from the exit opening of the dispensing tip 22.

Figures 6, 6A, 7:
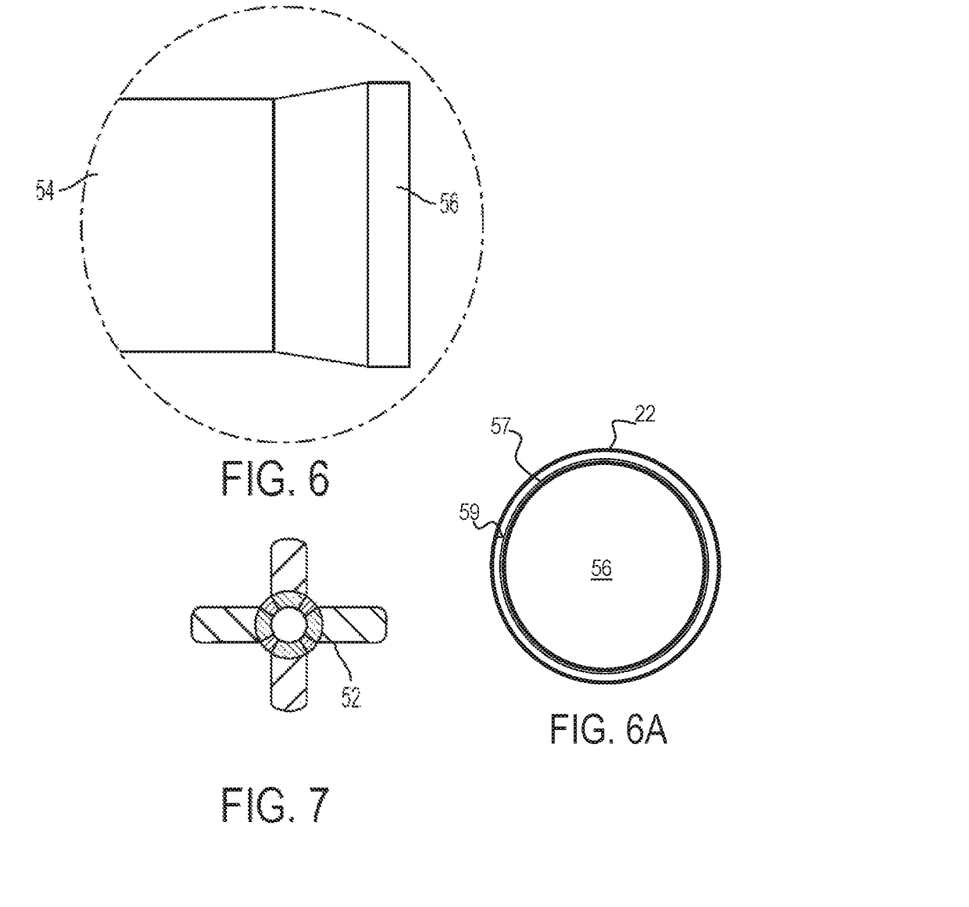
FIG. 6 illustrates a close-up view of detail 6 of the plunger shown in FIG. 5.
FIG. 6A shows a closeup view of a clearance between the plunger of FIG. 5 and a dispensing tip.
FIG. 7 illustrates a cross-sectional view taken along line 7-7 of the plunger show in FIG. 5.

Turning to FIGS. 5-7, the plunger 50 is shown in greater detail. While the plunger 50 is shown as straight, it may be straight or it may be bent or angled. The plunger 50, when loaded into the dispensing tip 22, will conform to the shape of the dispensing tip 22. Thus, for embodiments where the dispensing tip is bent, such as shown in FIGS. 1 and 2, the plunger may be curved or angled, or may become bent on insertion into the internal bore of the dispensing tip 22.

The proximal end 52 and distal end 54 of the plunger 50 may be configured with respect to the various portions of the dispensing tip 22. That is, the shape, size, and configuration of the proximal and distal ends of the dispensing tip may depend on the shape, size, and configuration of the inner bore of the dispensing tip 22.

As shown in FIGS. 5 and 7, the proximal end 52 of the plunger 50 may be include wings which extend from a core of the plunger 50. A proximal end 52 of the plunger may provide a contact surface for the set screw 17. The distal end 54 of the plunger 50 may include a flared region 56, as shown in FIG. 6. Confining the flared region to a small portion of the plunger reduces the contact area between the plunger and an inner surface of the dispensing tip. As such, the plunger is generally designed to have only a small amount of contact along the entire plunger length to allow for air flow as well as greater ease of dispensing any material contained within the dispensing tip due to less resistance. Reducing the contact area of the plunger provides several benefits, two of which include (a) formation of an 'air channel' to allow suction, and (b) improved slidability of the plunger within the dispensing tip barrel to make dispensing the powder/liquid material easier. Filling the dispensing tip using suction allows for a more reliable fill and the ability to preset the plunger depth automatically avoiding the need for a separate step.

This flared region may provide the clearance, i.e., the space between the outer circumferential surface of the tip 56 of the plunger and the inner wall of the dispensing tip 22, which limits or stops passage of the powdered material.

The dispensing tip 22 may be used with any pressure applying mechanism known in the art in order to deliver a forward moving pressure gradient onto the plunger, such as a gradient used to drive delivery of the powdered or liquid material from the dispensing tip 22 to the delivery site. One such non-limiting example of an external force applying member is that disclosed in U.S. Pat. No. 6,682,348. Moreover, the plunger 50 of the presently disclosed invention may be used in a dispensing tip as substantially described and detailed in U.S. Pat. No. 9,402,701, the content of which is included herein in its entirety.

Example

The tip filling device and methods of the present invention were used to fill a dispensing tip as disclosed herein with 4.5 mg of minocycline HCL. For comparative purposes, a dispensing tip according to the prior art was also filled with the same amount of minocycline HCL using methods and devices disclosed in the prior art, such as in U.S. Pat. Nos. 8,048,021 and 9,566,141. At least three different lot numbers of the powdered drug minocycline HCL were used to fill at least 12 dispensing tips per lot number, and the results were plotted as a probability that a dispensing tip may include a specific weight.

Figure 8:
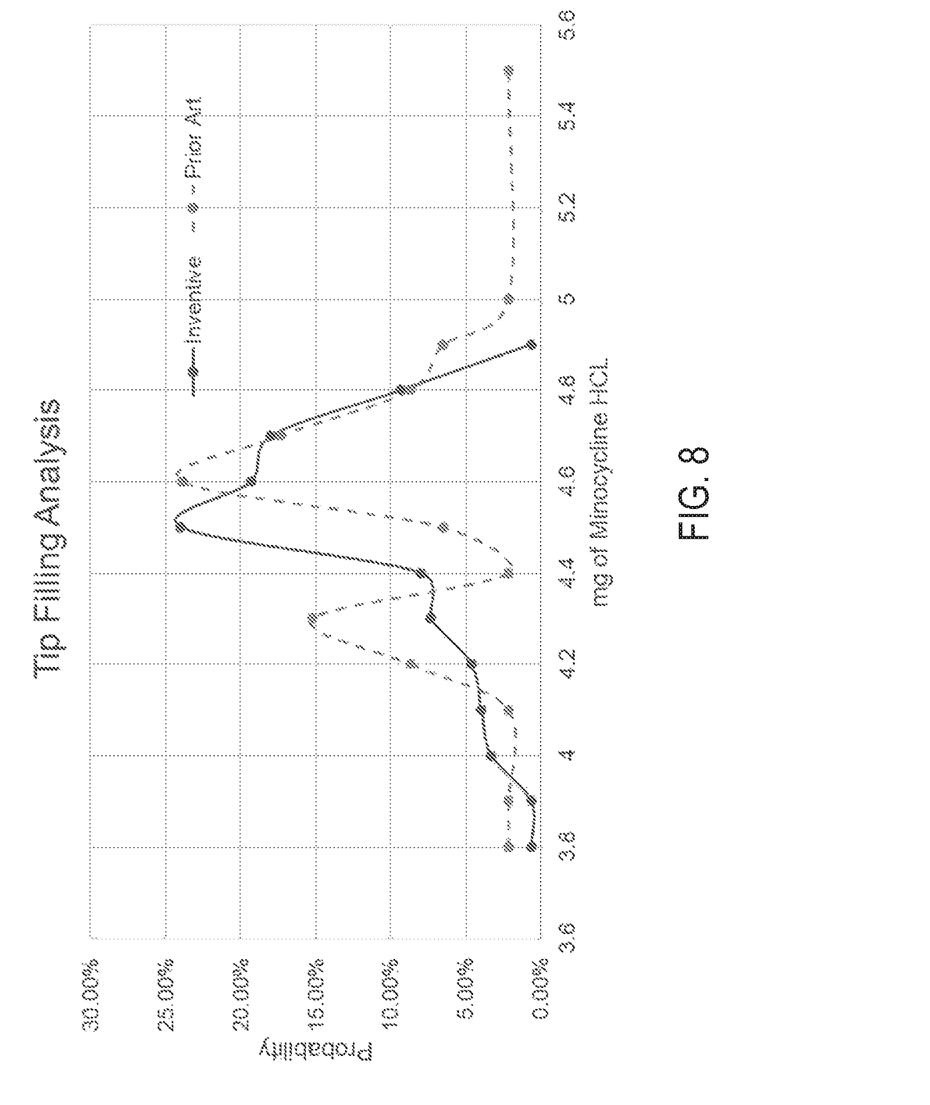
FIG. 8 shows the reproducibility of filling a dispensing tip with a powdered material using the device and method in accordance with certain aspects of the presently disclosed invention.

As shown in FIG. 8, the inventive devices and methods were capable of filling the dispensing tip with the expected weight of 4.5 mg of the powdered minocycline HCL about 24% of the time, with a standard deviation of 0.217 mg (solid line; total range of fill was 3.8 to 4.9 mg). The prior art devices and methods filled the dispensing tip with the expected weight only about 7% of the time, having a final average fill of 4.54 mg and a larger standard deviation of 0.302 mg (dashed line; total range of fill was 3.8 to 5.5 mg).

While specific embodiments of the invention have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the invention.

What is claimed is:

1. A device for filling a dispensing tip with a material, the device comprising:
    a vacuum manifold comprising at least one port;
    a vacuum source for creating a negative pressure in the vacuum manifold; and
    at least one dispensing tip having an axial bore therethrough and configured for air-tight attachment to the at least one port of the vacuum manifold via a proximal end of the at least one dispensing tip, wherein each dispensing tip includes a plunger having a stop at a distal end, the plunger moveable within the axial bore of the dispensing tip,
    wherein the negative pressure is sufficient to pull the material into the axial bore of the at least one dispensing tip to a level within the dispensing tip defined by an axial position of the stop, and
    wherein each port includes an adjustable set screw configured to contact a proximal end of the plunger and adjustable to vary the axial position of the plunger within the axial bore of the at least one dispensing tip.

2. The device of claim 1, wherein the material is a powdered material and a clearance between an outer surface of the stop and an inner wall of the axial bore at the distal end of the dispensing tip is less than a diameter of individual grains of the powdered material.

3. The device of claim 2, wherein the diameter of individual grains of the powdered material is 50 microns or greater.

4. The device of claim 1, wherein a clearance between an outer surface of the stop and an inner wall of the axial bore at the distal end of the dispensing tip is 50 microns or less.

5. The device of claim 1, wherein each port further comprises a gasket configured to provide the air-tight attachment of the at least one dispensing tip to the at least one port.

6. The device of claim 1, wherein each port further comprises a limit element configured to limit an axial position of the proximal end on the at least dispensing tip on the at least one port.

7. The device of claim 1, further comprising:
    a reservoir configured to contain the material and sized to accept the vacuum manifold and position an exit opening at the distal end of the at least one dispensing tip within the material.

8. The device of claim 1, wherein the vacuum manifold comprises:
    a manifold bore;
    an inlet aperture configured for air-tight connection with the vacuum source; and
    at least one outlet aperture configured for air-tight connection with the at least one port.

9. A device for filling a dispensing tip with a material, the device comprising:
    a vacuum manifold comprising at least one port;
    a vacuum source for creating a negative pressure in the vacuum manifold; and
    at least one dispensing tip having an axial bore therethrough and configured for air-tight attachment to the at least one port of the vacuum manifold via a proximal end of the at least one dispensing tip, wherein each dispensing tip includes a plunger having a stop at a distal end, the plunger moveable within the axial bore of the dispensing tip,
    wherein the negative pressure is sufficient to pull the material into the axial bore of the at least one dispensing tip to a level within the dispensing tip defined by an axial position of the stop, and
    wherein the stop comprises a liquid sensitive material that swells on contact with a liquid, so that a liquid material does not pass the stop toward the proximal end of the at least one dispensing tip.

10. A method of filling at least one dispensing tip with a powdered or liquid material, the method comprising:
    inserting a plunger into an axial bore of the at least one dispensing tip;
    attaching a proximal end of the at least one dispensing tip to at least one port on a vacuum manifold;

positioning the vacuum manifold with the at least one dispensing tip attached thereon within a reservoir containing the powdered or liquid material, wherein an exit opening at a distal end of the at least one dispensing tip is positioned in contact with the powdered material; and activating a vacuum source to provide a negative pressure within the vacuum manifold, wherein the negative pressure is sufficient to pull the powdered or liquid material into the axial bore of the at least one dispensing tip.

11. The method of claim 10, further comprising, before the step of attaching the at least one dispensing tip to the at least one port:

adjusting a position of a set screw of the at least one port, wherein the position of the set screw varies an axial position of the plunger within the axial bore of the at least one dispensing tip and an amount of the powdered or liquid material which may be pulled into the axial bore of the at least one dispensing tip.

12. The method of claim 10, wherein a clearance between an outer surface of a stop at a distal end of the plunger and an inner wall of the axial bore at the distal end of the at least one dispensing tip is less than a diameter of individual grains of the powdered material.

13. The method of claim 12, wherein the diameter of the individual grains of the powdered material is 50 microns or greater.

14. The method of claim 10, wherein a clearance between an outer surface of a stop at a distal end of the plunger and an inner wall of the axial bore at the distal end of at least one dispensing tip is 50 microns or less.

* * * * *